US007728557B2

(12) United States Patent
Iwatsuki et al.

(10) Patent No.: US 7,728,557 B2
(45) Date of Patent: Jun. 1, 2010

(54) ELECTRIC DISCHARGE CONTROLLER, ELECTRIC DISCHARGE CONTROL METHOD AND ITS PROGRAM

(75) Inventors: Ken Iwatsuki, Anjo (JP); Takeshi Kitahata, Tokyo (JP)

(73) Assignees: Aisin AW Co., Ltd., Anjo (JP); Kabushiki Kaisha Toshiba, Tokyo (JP)

( * ) Notice: Subject to any disclaimer, the term of this patent is extended or adjusted under 35 U.S.C. 154(b) by 734 days.

(21) Appl. No.: 10/959,129

(22) Filed: Oct. 7, 2004

(65) Prior Publication Data

US 2005/0078431 A1    Apr. 14, 2005

(30) Foreign Application Priority Data

Oct. 10, 2003    (JP)    ............................. 2003-352395

(51) Int. Cl.
*H02J 7/00*    (2006.01)
(52) U.S. Cl. ....................................... 320/136; 320/166
(58) Field of Classification Search ................. 320/166, 320/135, 136; 318/153
See application file for complete search history.

(56) References Cited

U.S. PATENT DOCUMENTS

| 6,563,230 | B2 * | 5/2003 | Nada ......................... 290/40 C |
| 7,023,150 | B2 * | 4/2006 | Hisada et al. ................. 318/34 |
| 2003/0141123 | A1 * | 7/2003 | Sugiura et al. ............. 180/65.2 |

FOREIGN PATENT DOCUMENTS

| JP | A 9-70196 | 3/1997 |
| JP | A 9-215102 | 8/1997 |
| JP | A-11-308704 | 11/1999 |

* cited by examiner

*Primary Examiner*—Patrick J Assouad
*Assistant Examiner*—Aaron Piggush
(74) *Attorney, Agent, or Firm*—Oliff & Berridge, PLC

(57) ABSTRACT

The electric charge of a capacitor can be reliably discharged. Therefore, an electric discharge controller has an electrically operated machine, an inverter, a capacitor, a voltage command value generating processor for generating a voltage command value for driving, an electric discharge control processor for generating a voltage command value for electric discharge, and a driving signal generating processor. When an electric current is supplied from a direct electric current source to the inverter, the driving signal generating processor generates a driving signal on the basis of the voltage command value for driving. When the supply of the electric current from the direct electric current source to the inverter is interrupted, the driving signal generating processor generates the driving signal on the basis of the voltage command value for electric discharge, and supplies the driving signal to the inverter. The electric discharge control processor generates the voltage command value for electric discharge on the basis of the difference between a target direct current voltage and the direct current voltage. When the supply of the electric current from the direct electric current source to the inverter is interrupted, the driving signal is generated on the basis of the voltage command value for electric discharge and is supplied to the inverter.

14 Claims, 2 Drawing Sheets

ELECTRIC DISCHARGE CONTROLLER, ELECTRIC DISCHARGE CONTROL METHOD AND ITS PROGRAM

This application claims priority from JP 2003-352395, filed Oct. 10, 2003, the disclosure of which is incorporated herein in its entirety by reference thereto.

BACKGROUND OF THE INVENTION

1. Field of Invention

The invention relates to an electric discharge controller, an electric discharge control method and its program.

2. Description of Related Art

In a vehicle drive unit mounted to an electric automobile, as an electrically operated vehicle, and generating the torque of a drive motor, i.e., drive motor torque, and transmitting the drive motor torque to a drive wheel, the drive motor is conventionally operated by receiving a direct electric current from a battery at a power applying time (driving) time, and generates the drive motor torque. At a regenerative (electricity generating) time, the drive motor receives torque by inertia of the electric automobile, and generates the direct electric current and supplies this electric current to the battery.

Further, a planetary gear unit having a sun gear, a ring gear and a carrier is arranged in a vehicle drive unit mounted to a hybrid type vehicle as the electrically operated vehicle and transmitting one portion of the torque of an engine, i.e., engine torque to an electric generator (electric generator motor) and transmitting the remaining engine torque to a drive wheel. The carrier and the engine are connected to each other. The ring gear, the drive motor and the drive wheel are connected to each other. The sun gear and the electric generator are connected to each other. Rotation outputted from the ring gear and the drive motor is transmitted to the drive wheel and the driving force is generated.

In each of the vehicle drive units, an inverter is arranged between the drive motor and a drive motor controller. The inverter is operated in accordance with a driving signal sent from the drive motor controller. The electric currents of U, V and W phases are generated by receiving the direct electric current from the battery. The electric currents of the respective phases are supplied to the drive motor, and the drive motor is driven. Further, in the hybrid type vehicle, the inverter is also arranged between the electric generator and an electric generator controller. The inverter is operated in accordance with a driving signal sent from the electric generator controller, operates the electric generator and generates the direct electric current. The direct electric current is sent to the battery and the battery is charged. The electric currents of the U, V and W phases are generated by receiving the direct electric current from the battery. The electric currents of the respective phases are supplied to the electric generator and the electric generator is operated.

Therefore, the inverter has a plurality of transistors, e.g., six transistors. Accordingly, when the driving signal is sent to each transistor in a predetermined pattern, the transistor is turned on and off, the electric currents of the respective phases are generated and the direct electric current is generated.

When the supply of the electric current from the battery to the inverter is interrupted and the driving of the drive motor is stopped, for example, when running of the electric automobile is terminated and an ignition switch is turned off, an electric charge corresponding to electrostatic capacity is accumulated in a capacitor arranged between the battery and the inverter. When a power source of the drive motor controller is turned off while the electric charge is accumulated in the capacitor, the driving signal sent to each transistor is transiently set to an un-control state. As its result, there is a case in which the transistor is turned on and a short-circuit electric current flows so that the durability of the drive motor controller is reduced.

Therefore, an electric discharge controller is provided and the capacitor is electrically discharged by the electric discharge controller. The electric discharge controller sets an electric current command value for magnetization, e.g., a d-axis electric current command value $id^*$ to nonzero (a predetermined value except for zero (0)), and also substantially sets an electric current command value for torque generation, e.g., a q-axis electric current command value $iq^*$ to zero. Thus, the drive motor is driven without generating the drive motor torque and the electric charge accumulated in the capacitor is consumed within the drive motor (e.g., see JP-A-9-70196).

Further, when the drive motor is driven, another electric discharge controller performs position non-synchronous electric current control by adding a higher harmonic wave to the d-axis electric current command value $id^*$ and the q-axis electric current command value $id^*$. The drive motor torques are mutually canceled within the drive motor, the electric charge accumulated in the capacitor is consumed within the drive motor, and no drive motor torque is transmitted to the drive shaft (e.g., see JP-A-9-215102).

SUMMARY OF THE INVENTION

However, in each of the conventional electric discharge controllers described, it is necessary to drive the drive motor. In this case, it is necessary to detect the phase electric current by an electric current sensor. Therefore, when an abnormality is generated in the electric current sensor for some reason, no electric charge of the capacitor can be discharged.

Thus, an object of the invention is to provide an electric discharge controller, an electric discharge control method and its program able to reliably discharge the electric charge of the capacitor by solving the problems of the conventional electric discharge controllers.

Therefore, the electric discharge controller of the invention comprises an electrically operated machine having a rotor and a stator; an inverter for receiving a direct electric current supplied from a direct electric current source and generating an alternating electric current and supplying the alternating electric current to the electrically operated machine; a capacitor arranged between the direct electric current source and the inverter; voltage command value generation processing means for generating a voltage command value for driving the electrically operated machine; electric discharge control processing means for generating a voltage command value for electric discharge; and driving signal generation processing means for generating a driving signal on the basis of the voltage command value for driving at the supplying time of the electric current from the direct electric current source to the inverter, and generating the driving signal on the basis of the voltage command value for electric discharge at an interrupting time of the supply of the electric current from the direct electric current source to the inverter, and supplying the driving signal to the inverter.

Further, the electric discharge control processing means generates the voltage command value for electric discharge on the basis of the difference between a target direct current voltage showing a target value of the direct current voltage and the direct current voltage detected by a direct current voltage detecting section.

In this case, when the supply of the electric current from the direct electric current source to the inverter is interrupted, the driving signal is generated on the basis of the voltage command value for electric discharge generated on the basis of the difference between the target direct current voltage showing the target value of the direct current voltage and the direct current voltage detected by the direct current voltage detecting section. This driving signal is supplied to the inverter. Accordingly, the alternating electric current as the voltage command value can be supplied to the electrically operated machine without using an electric current sensor. Thus, an electric charge accumulated in the capacitor can be consumed within the electrically operated machine and the electric charge of the capacitor can be reliably discharged.

In the electric discharge control method of the invention, a voltage command value for driving for operating an electrically operated machine having a rotor and a stator is generated; a voltage command value for electric discharge is generated; a driving signal is generated on the basis of the voltage command value for driving at the supplying time of a direct electric current from a direct electric current source to an inverter, wherein the driving signal is generated on the basis of the voltage command value for electric discharge at an interrupting time of the supply of the electric current from the direct electric current source to the inverter; and the driving signal is supplied to the inverter.

Further, the voltage command value for electric discharge is generated on the basis of the difference between a target direct current voltage showing a target value of the direct current voltage and the direct current voltage detected by a direct current voltage detecting section.

In the program of the electric discharge control method of the invention, a computer functions as voltage command value generation processing means for generating a voltage command value for driving an electrically operated machine having a rotor and a stator; electric discharge control processing means for generating a voltage command value for electric discharge; and driving signal generation processing means for generating a driving signal on the basis of the voltage command value for driving at the supplying time of an electric current from a direct electric current source to an inverter, and generating the driving signal on the basis of the voltage command value for electric discharge at an interrupting time of the supply of the electric current from the direct electric current source to the inverter, and supplying this driving signal to the inverter.

Further, the electric discharge control processing means generates the voltage command value for electric discharge on the basis of the difference between a target direct current voltage showing a target value of the direct current voltage and the direct current voltage detected by a direct current voltage detecting section.

An electric discharge controller, comprising an electrically operated machine having a rotor and a stator; an inverter for receiving a direct electric current supplied from a direct electric current source and generating an alternating electric current and supplying the alternating electric current to the electrically operated machine; a capacitor arranged between the directed electric current source and the inverter; and a control element that generates a voltage command value for driving the electrically operated machine; generates a voltage command value for electric discharge; generates a driving signal on the basis of the voltage command value for driving at the supplying time of the electric current from the direct electric current source to the inverter, and generates the driving signal on the basis of the voltage command value for electric discharge at an interrupting time of the supply of the electric current from the direct electric current source to the inverter, and supplies the driving signal to the inverter, wherein the electric discharge control processing means generates the voltage command value for electric discharge on the basis to the difference between a target direct current voltage showing a target value of the direct current voltage and the direct current voltage detected by a direct current voltage detecting section.

BRIEF DESCRIPTION OF THE DRAWINGS

The invention will be described with reference to the drawings, in which.

DETAILED DESCRIPTION OF PREFERRED EMBODIMENTS

Figure 1:
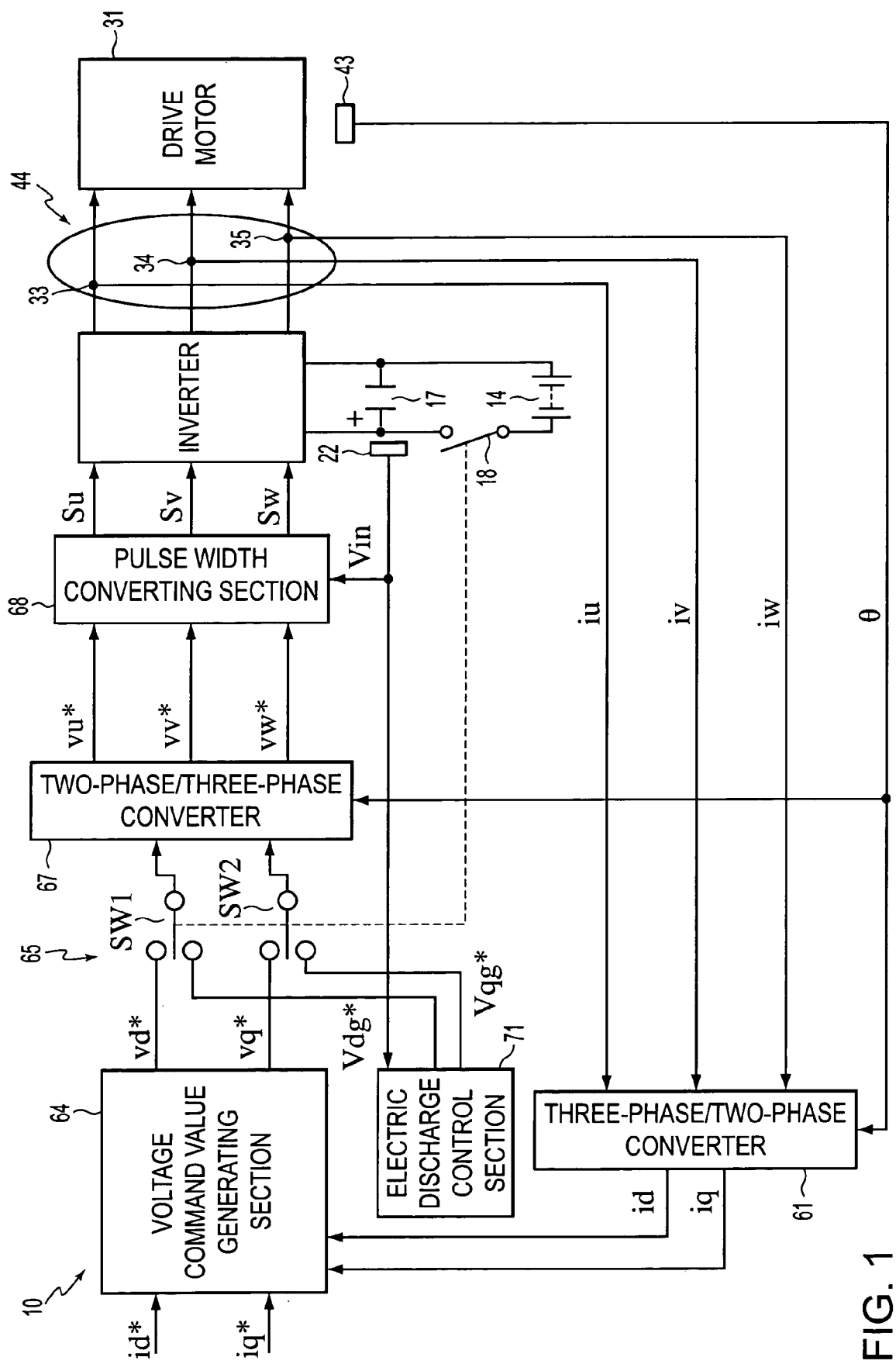
FIG. 1 is a block diagram of an electric discharge controller in an exemplary embodiment of the invention.
Figure 2:
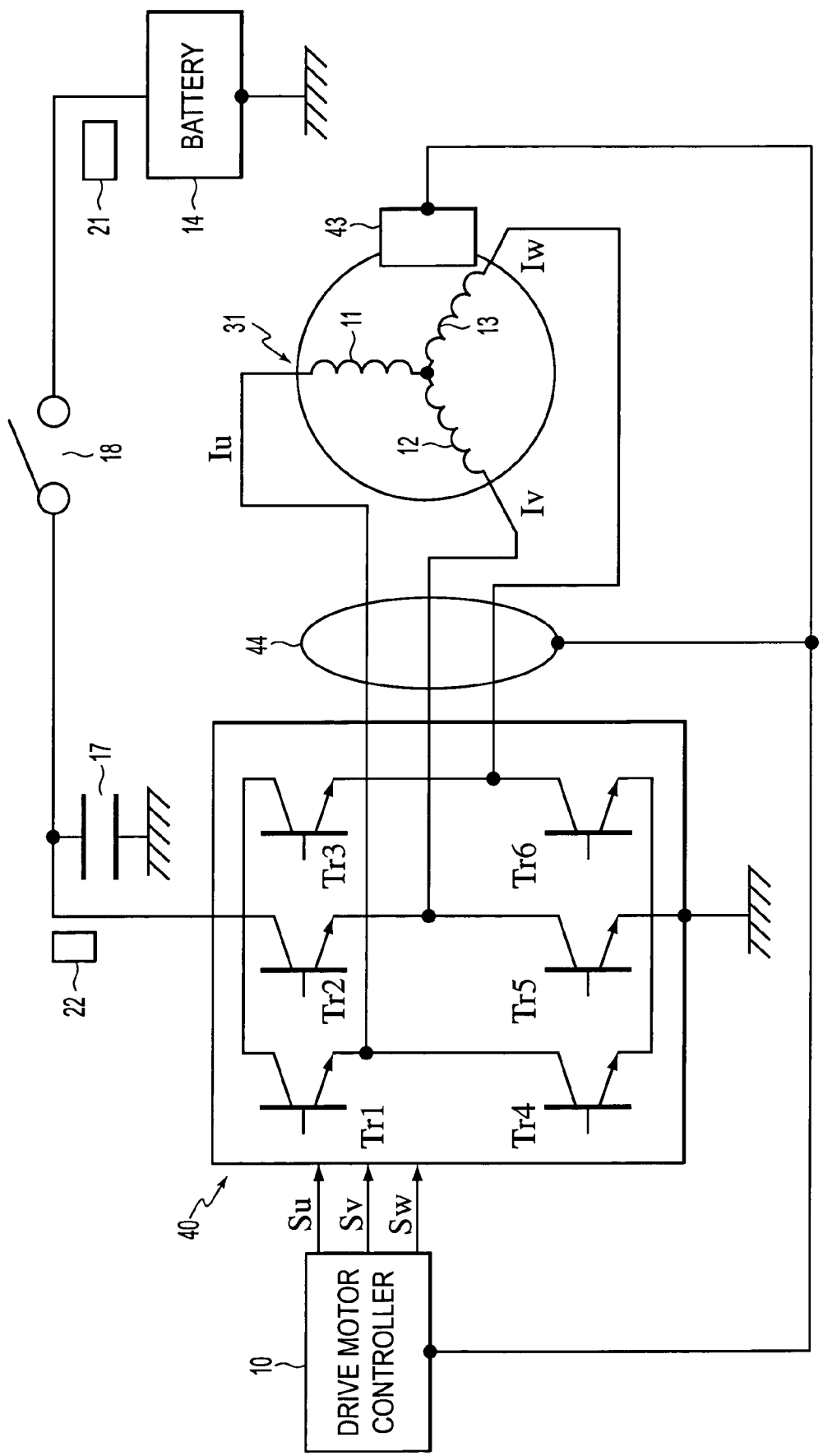
FIG. 2 is a conceptual view of a vehicle drive unit in the exemplary embodiment.

An exemplary embodiment of the invention will be explained in the context of an electric automobile as an electrically operated vehicle.

In the figures, reference numeral 10 designates a drive motor controller, functioning as a computer in accordance with various kinds of programs, data, etc. and having a CPU and a recorder, (not shown) such as a RAM, a ROM, etc. Reference numeral 31 designates a drive motor as an electrically operated machine. A DC brushless drive motor is used as the drive motor 31. The drive motor 31 has a rotatable rotor (not shown), and a stator (not shown) arranged radially outward from the rotor. The rotor has a rotor core attached to a shaft (not shown) of the drive motor 31. Permanent magnets are arranged in a plurality of portions in the circumferential direction of the rotor core. For example, the permanent magnets are arranged in twelve portions in the circumferential direction of the rotor core such that the N and S poles are alternately directed toward the outer circumferential face. Thus, six magnetic pole pairs are formed.

The stator has a stator core (not shown) and stator coils 11 to 13 of the U, V, W phases wound around the stator core. Teeth are formed in plural portions in the circumferential direction of the stator core so as to be projected inward in the radial direction.

A battery 14, as a direct electric current source, and an inverter 40 are arranged to run the electric automobile by driving the drive motor 31. The direct electric current is supplied from the battery 14 to the inverter 40 and the inverter 40 converts the direct electric current into electric currents Iu, Iv, Iw of the U, V, W phases as alternating electric currents. The electric currents Iu, Iv, Iw of the respective phases are respectively supplied to the drive motor 31, i.e., the respective stator coils 11 to 13.

Therefore, the inverter 40 has transistors Tr1 to Tr6 as a plurality of switching elements, e.g., six switching elements. The inverter 40 receives pulse width modulating signals Su, Sv, Sw as driving signals from the drive motor controller 10. The electric currents Iu, Iv, Iw of the respective phases are generated by selectively turning on and off the respective transistors Tr1 to Tr6. A transistor module made up of a pair of the transistors, IPM building-in a drive circuit, etc. can be also used as the inverter 40.

A capacitor 17, for smoothing, is arranged between the inverter 40 and the battery 14 in parallel with the inverter 40. An electric charge corresponding to electrostatic capacity is accumulated in the capacitor 17. Further, an ignition switch 18 is arranged between the capacitor 17 and the battery 14 to turn on and off a power source of the electric automobile. A resolver 43, as a magnetic pole position detecting portion, is attached to the shaft of the drive motor 31. A magnetic pole position θ of the rotor is detected by the resolver 43. In this exemplary embodiment, the resolver 43 is used as the magnetic pole position detecting portion, but a Hall element (not shown) can be used instead of the resolver 43. In this case, the Hall element generates a position detecting signal every predetermined angle in accordance with the rotation of the rotor. When a magnetic pole position detecting circuit (not shown) receives the position detecting signal, the magnetic pole position detecting circuit detects the magnetic pole position θ on the basis of a combination of signal levels of the position detecting signal.

An electric current detector 44 is arranged to control the electric currents Iu, Iv, Iw of the respective phases. The electric current detector 44 is arranged in lead wires of the stator coils 11 to 13, and is provided by electric current sensors 33 to 35 as electric current detecting portions for detecting the electric currents Iu, Iv, Iw of the respective phases. The electric current sensors 33 to 35 send the detected electric currents, i.e., the detecting electric currents iu, iv, iw to the drive motor controller 10.

The stator coils 11 to 13 are connected in a star shape. Accordingly, when the values of the electric currents of two phases among the respective phases are determined, the value of the electric current of the remaining one phase is also determined. Accordingly, for example, the electric current sensors are arranged in only the stator coils 11, 12, and the detecting electric currents iu, iv are detected by the electric current sensors, and the detecting electric current iw of the electric current Iw, as the electric current of the remaining one phase, can be also calculated.

A battery voltage sensor 21 as a first direct electric current voltage detecting section and a battery voltage detecting section is arranged adjacent to the battery 14 so as to detect the voltage of the battery 14, i.e., the battery voltage Vb. An inverter voltage sensor 22, as a second direct current voltage detecting section, and an inverter voltage detecting section are arranged adjacent to the capacitor 17 to detect the voltage at the inlet side of the inverter 40, i.e., the inverter voltage Vin. The battery voltage Vb and the inverter voltage Vin detected by the battery voltage sensor 21 and the inverter voltage sensor 22, respectively, are sent to the drive motor controller 10 as direct current voltages. Because the inverter voltage sensor 22 is arranged adjacent to the capacitor 17, the voltage of the capacitor 17, i.e., the capacitor voltage is shown by the inverter voltage Vin.

A drive motor rotating speed calculation processing means of the CPU of the drive motor controller 10 performs drive motor rotating speed calculation processing, and reads the magnetic pole position θ and calculates the angular velocity ω of the drive motor 31 on the basis of the magnetic pole position θ. Further, the drive motor rotating speed calculation processing means calculates the rotating speed of the drive motor 31, i.e., the drive motor rotating speed NM. Further, a vehicle speed detection processing means of the CPU performs vehicle speed detection processing and calculates a vehicle speed V on the basis of the angular velocity ω, and sends the vehicle speed V to a vehicle controller (not shown) for controlling the operation of the electric automobile.

The vehicle controller functions as a computer in accordance with various kinds of programs, data, etc., and has a CPU and a recorder of a RAM, a ROM, etc. A command value generating section of the CPU of the vehicle controller calculates vehicle request torque on the basis of the vehicle speed V, an accelerator aperture detected by an accelerator sensor (not shown); and a brake stepping-in amount detected by a brake sensor (not shown). The command value generating section then generates drive motor target torque TM* showing a target value of drive motor torque TM corresponding to the vehicle request torque, and sends the drive motor target torque TM* to the drive motor controller 10.

In the drive motor controller 10, feedback control is performed in a d-q axis model in which a d-axis is set in the direction (magnetic flux direction) of a magnetic pole pair of the rotor and a q-axis is set in the direction (the direction advanced 90 degrees in the positive rotating direction of the drive motor 31 with respect to the d-axis) perpendicular to the d-axis. Therefore, a drive motor control processing means (not specifically shown) of the CPU performs drive motor control processing and reads the drive motor target torque TM*, the angular velocity ω and the inverter voltage Vin. The drive motor control processing means then determines a d-axis electric current command value id* showing the d-axis component of an electric current command value "is" shown by a vector and a q-axis electric current command value iq* showing a q-axis component on the basis of the drive motor target torque TM*, the angular velocity ω and the inverter voltage Vin with reference to an electric current command value map recorded to the recorder.

A three-phase/two-phase converter 61, as a first conversion processing means of the CPU, performs three-phase/two-phase conversion processing as first conversion processing, and reads and converts the detecting electric currents iu, iv, iw and the magnetic pole position θ into a d-axis electric current id and a q-axis electric current iq as predetermined electric currents.

The d-axis electric current command value id*, the q-axis electric current command value iq*, the d-axis electric current id and the q-axis electric current iq are sent to an electric current feedback control section 64 as a voltage command value generation processing means of the CPU. The electric current feedback control section 64 performs voltage command value generation processing and generates a d-axis voltage command value vd* and a q-axis voltage command value vq* as voltage command values for driving the drive motor 31 as follows on the basis of the d-axis electric current command value id*, the q-axis electric current command value iq*, the d-axis electric current id and the q-axis electric current iq:

$$vd^*=(R+dLd/dt)id^*+\omega(-Lq \cdot iq),$$

$$vq^*=(R+dLq/dt)iq^*+\omega(Mif+Ld \cdot id).$$

The electric current feedback control section 64 sends the d-axis voltage command value vd* and the q-axis voltage command value vq* to a two-phase/three-phase converter 67, as a second conversion processing means and a phase voltage command value generation processing means, through a voltage command value switching section 65 as a voltage command value switching means.

Here, R shows a resistance value of each of the stator coils 11 to 13 and Ld shows a d-axis inductance. Further, Lq shows a q-axis inductance and Mif shows a counter electromotive voltage constant.

Subsequently, the two-phase/three-phase converter 67 performs two-phase/three-phase conversion processing, as second conversion processing and second voltage command value generation processing, and converts the d-axis voltage command value vd* and the q-axis voltage command value vq* into voltage command values vu*, vv*, vw* of the respective phases as phase voltage command values on the basis of the d-axis voltage command value vd*, the q-axis voltage command value vq* and the magnetic pole position θ. The two-phase/three-phase converter 67 then sends the voltage command values vu*, vv*, vw* to a pulse width converting section 68 as a driving signal generation processing means. The pulse width converting section 68 performs driving signal generation processing and generates pulse width modulating signals Su, Sv, Sw of the respective phases on the basis of the voltage command values vu*, vv*, vw* of the respective phases and the inverter voltage Vin, and sends the pulse width modulating signals Su, Sv, Sw to the inverter 40.

A first voltage command value is provided by the d-axis voltage command value vd* and the q-axis voltage command value vq*, and a second voltage command value is provided by the voltage command values vu*, vv*, vw* of the respective phases.

As its result, as mentioned above, the electric currents Iu, Iv, Iw of the respective phases are supplied to the stator coils 11 to 13. Thus, the electric automobile can run by driving the drive motor 31.

The d-axis voltage command value vd* can be also generated on the basis of the electric current difference Δid between the d-axis electric current id supplied to the drive motor 31 and the d-axis electric current command value id*, and the q-axis voltage command value vq* can be also generated on the basis of the electric current difference Δiq between the q-axis electric current iq supplied to the drive motor 31 and the q-axis electric current command value iq* by arranging an electric current feedback control section as the voltage command value generation processing means.

When the running of the electric automobile is terminated and the ignition switch 18 is turned off, for example, the supply of the electric current from the battery 14 to the inverter 40 is interrupted in association with the turning-off, and the driving of the drive motor 31 is stopped. At this time, an electric charge corresponding to electrostatic capacity is accumulated in the capacitor 17. When the power source of the drive motor controller 10 is turned off while the electric charge is accumulated in the capacitor 17, the respective pulse width modulating signals Su, Sv, Sw sent to the transistors Tr1 to Tr6 transiently attain an un-controlled state. As its result, there is a case in which the transistors Tr1 to Tr6 are turned on and a short-circuit electric current flows. Thus, durability of the drive motor controller 10 is reduced.

Therefore, an electric discharge control section 71, as an electric discharge control processing means, is connected to the two-phase/three-phase converter 67 through the voltage command value switching section 65. This electric discharge control section 71 performs electric discharge control processing, and generates a d-axis voltage command value Vdg* and a q-axis voltage command value Vqg* as voltage command values for electric discharge, and sends these command values to the voltage command value switching section 65.

For example, the electric discharge control processing means can generate the d-axis voltage command value Vdg* on the basis of a difference between a target direct current voltage Vdc* showing a target value of a direct current voltage and the direct current voltage detected by the direct current voltage detecting section.

Therefore, a voltage command value calculation processing means (not specifically shown) for electric discharge in the electric discharge control section 71 performs voltage command value calculation processing for electric discharge, and reads the inverter voltage Vin. The voltage command value calculation processing means for electric discharge then calculates the difference ΔVdc:

$$\Delta Vdc = Vdc^* - Vin,$$

between the inverter voltage Vin and a target direct current voltage Vdc* so as to set the inverter voltage Vin to a direct current voltage showing a target value set in advance, i.e., to the target direct current voltage Vdc*. In this case, the inverter voltage Vin is finally set to be equal to the target direct current voltage Vdc* in the electric discharge control processing. Accordingly, the target direct current voltage Vdc* is set sufficiently low so as to not reduce the durability of the drive motor controller 10 even if the transistors Tr1 to Tr6 are turned on and the short-circuit electric current flows.

Subsequently, the voltage command value calculation processing means for electric discharge performs PI control on the basis of the difference ΔVdc and calculates a d-axis voltage command value Vdg*:

$$Vdg^* = Kp \cdot \Delta Vdc + Ki \cdot \Sigma \Delta Vdc.$$

Here, Kp is a gain for a proportional calculation, Ki is a gain for an integral calculation, and ΣΔVdc is an integral value of the difference ΔVdc.

Further, the voltage command value calculation processing means for electric discharge sets the q-axis voltage command value Vqg* to zero so as to set the q-axis electric current iq to zero. The q-axis voltage command value Vqg* is not necessarily set to zero so as to set the q-axis electric current iq to zero, but can be also generated by:

$$Vqg^* = \omega \cdot Mif,$$

on the basis of the angular velocity ω and the counter electromotive voltage constant Mif.

The voltage command value switching section 65 is provided by switches SW1, SW2. While the ignition switch 18 is turned on, the voltage command value switching section 65 is set to a first switching state, and connects the electric current feedback control section 64 and the two-phase/three-phase converter 67, and interrupts the electric discharge control section 71 and the two-phase/three-phase converter 67. In contrast to this, when the ignition switch 18 is turned off, the voltage command value switching section 65 is set to a second switching state and interrupts the electric current feedback control section 64 and the two-phase/three-phase converter 67 and connects the electric discharge control section 71 and the two-phase/three-phase converter 67. Accordingly, when the voltage command value switching section 65 is set to the first switching state, the d-axis voltage command value Vd* and the q-axis voltage command value Vq* are sent to the two-phase/three-phase converter 67. In contrast to this, when the voltage command value switching section 65 is set to the second switching state, the d-axis voltage command value Vdg* and the q-axis voltage command value Vqg* are sent to the two-phase/three-phase converter 67.

The voltage command value switching section 65 is set to the second switching state, but the d-axis voltage command value Vdg* and the q-axis voltage command value Vqg* are sent to the two-phase/three-phase converter 67. However, as the q-axis voltage command value Vqg* is zero, the two-phase/three-phase converter 67 converts the d-axis voltage command value Vdg* and the magnetic pole position θ into the voltage command values vu*, vv*, vw* of the respective phases as phase voltage command values for electric discharge, and sends the voltage command values vu*, vv*, vw* to the pulse width converting section 68. The pulse width converting section 68 generates the pulse width modulating signals Su, Sv, Sw of the respective phases for electric discharge on the basis of the voltage command values vu*, vv*, vw* of the respective phases and the inverter voltage Vin, and sends the pulse width modulating signals Su, Sv, Sw to the inverter 40.

As a result, the d-axis voltage Vd is applied to the stator coils 11 to 13, and the electric currents Iu, Iv, Iw corresponding to the d-axis electric current id are supplied. In this case, no voltage command values vu*, vv*, vw* corresponding to the q-axis voltage command value Vqg* are generated in the two-phase/three-phase converter 67 and no pulse width modulating signals Su, Sv, Sw corresponding to the q-axis voltage command value Vqg* are generated in the pulse width converting section 68. Accordingly, no electric currents Iu, Iv, Iw corresponding to the q-axis electric current are supplied to the stator coils 11 to 13.

Energy E proportional to the second power of the electric currents Iu, Iv, Iw:

$$E = Iu^2 Ru + Iv^2 Rv + Iw^2 Rw,$$

is consumed in the drive motor 31. Ru, Rv and Rw are respectively resistances of the stator coils 11 to 13.

Further, the electric charge of the capacitor 17 can be reliably discharged. In this case, the electric currents Iu, Iv, Iw correspond to the d-axis electric current id, and no q-axis voltage Vq is applied to the stator coils 11 to 13 and no q-axis electric current iq for torque generation is supplied. Accordingly, as the electric currents Iu, Iv, Iw corresponding to the q-axis electric current iq are supplied to the stator coils 11 to 13, drive motor 31 is not driven and no drive motor torque TM is generated.

When the q-axis voltage command value Vqg* is set to ω·Mif, the q-axis voltage Vq is applied to the stator coils 11 to 13, but no q-axis electric current iq is supplied. Accordingly, in this case, drive motor 31 is also not driven and, again, no drive motor torque TM is generated.

Thus, when the ignition switch 18 is turned off, the electric currents Iu, Iv, Iw calculated from the d-axis voltage command value Vdg* and the q-axis voltage command value Vqg*, and having no amount corresponding to the q-axis electric current iq, are supplied to the stator coils 11 to 13, and the energy E is consumed in the drive motor 31. Accordingly, the electric charge accumulated in the capacitor 17 can be consumed within the drive motor 31. Hence, no power source of the drive motor controller 10 is turned off while the electric charge is accumulated in the capacitor 17. Therefore, no short-circuit electric current flows to the drive motor controller 10 even when each of the transistors Tr1 to Tr6 is turned on. As a result, the durability of the drive motor controller 10 can be improved.

Further, no drive motor torque TM is transmitted to the drive shaft because no drive motor torque TM is generated while the electric charge accumulated in the capacitor 17 is consumed within the drive motor 31.

Further, in the two-phase/three-phase converter 67, it is not necessary to generate the d-axis voltage command value vd* on the basis of the d-axis electric current id and the d-axis electric current command value id* and generate the q-axis voltage command value vq* on the basis of the q-axis electric current iq and the q-axis electric current command value iq*. Therefore, the d-axis electric current id and the q-axis electric current iq are not required. Accordingly, because no detecting electric currents iu, iv, iw are required, the electric charge of the capacitor 17 can be reliably discharged without using the electric current sensors 33 to 35 even if an abnormality is generated in the electric current sensors 33 to 35.

The invention is not limited to the above exemplary embodiment, but can be variously modified on the basis of the features of the invention without departing from the scope of the invention.

What is claimed is:

1. An electric discharge controller, comprising:
   an electrically operated machine having a rotor and a stator;
   an inverter for receiving a direct electric current supplied from a direct electric current source and generating an alternating electric current and supplying the alternating electric current to the electrically operated machine;
   a capacitor arranged between the direct electric current source and the inverter;
   voltage command value generation processing means for generating a voltage command value for driving the electrically operated machine;
   electric discharge control processing means for generating a voltage command value for electric discharge of a capacitor voltage; and
   driving signal generation processing means for generating a driving signal for operating the inverter on the basis of the voltage command value for driving while the direct electric current is supplied from the direct electric current source to the inverter, and for generating the driving signal on the basis of the voltage command value for electric discharge when a switch arranged between the direct electric current source and the inverter is turned off and the supply of the direct electric current is interrupted, and for supplying the driving signal to the inverter, wherein the electric discharge control processing means generates the voltage command value for electric discharge on the basis of a difference between a target direct current voltage that is a target value for electrically discharging the capacitor voltage to a voltage so as to not reduce durability even if short-circuit electric current flows in transistors of the inverter and a direct current voltage detected by a direct current voltage detecting section detecting the capacitor voltage.

2. The electric discharge controller according to claim 1, wherein the voltage command value generation processing means generates a d-axis voltage command value and a q-axis voltage command value as the voltage command value for driving, and the electric discharge control processing means generates the d-axis voltage command value and the q-axis voltage command value as the voltage command value for electric discharge.

3. The electric discharge controller according to claim 2, wherein the voltage command value generation processing means has electric current feedback control processing means for generating the d-axis voltage command value and the q-axis voltage command value on the basis of an electric current difference between an electric current supplied to the electrically operated machine and an electric current command value.

4. The electric discharge controller according to claim 2, wherein the electric discharge control processing means generates the d-axis voltage command value on the basis of the difference between the target direct current voltage that is the target value of the capacitor voltage and the direct current voltage detected by the direct current voltage detecting section detecting the capacitor voltage.

5. The electric discharge controller according to claim 2, wherein the electric discharge control processing means sets the q-axis voltage command value to zero.

6. The electric discharge controller according to claim 2, wherein the electric discharge control processing means generates the q-axis voltage command value on the basis of an angular velocity and a counter electromotive voltage constant.

7. The electric discharge controller according to claim 1, wherein the voltage command value for electric discharge is defined so that no q-axis electric current for torque generation is supplied.

8. An electric discharge controller, comprising:
an electrically operated machine having a rotor and a stator;
an inverter for receiving a direct electric current supplied from a direct electric current source and generating an alternating electric current and supplying the alternating electric current to the electrically operated machine;
a capacitor arranged between the direct electric current source and the inverter; and
a control element that:
generates a voltage command value for driving the electrically operated machine;
generates a voltage command value for electric discharge of the capacitor voltage;
generates a driving signal for operating the inverter on the basis of the voltage command value for driving while the direct electric current is supplied from the direct electric current source to the inverter, and generates the driving signal on the basis of the voltage command value for electric discharge when a switch arranged between the direct electric current source and the inverter is turned off and the supply of the direct electric current is interrupted, and
supplies the driving signal to the inverter, wherein the control element generates the voltage command value for electric discharge on the basis of a difference between a target direct current voltage that is a target value for electrically discharging the capacitor voltage to a voltage so as to not reduce durability even if short-circuit electric current flows in transistors of the inverter and a direct current voltage detected by a direct current voltage detecting section detecting the capacitor voltage.

9. The electric discharge controller according to claim 8, wherein the control voltage element, in generating the voltage command value for driving, generates a d-axis voltage command value and a q-axis voltage command value, and in generating the voltage command value for electric discharge generates the d-axis voltage command value and the q-axis voltage command value.

10. The electric discharge controller according to claim 9, wherein the control element generates the d-axis voltage command value and the q-axis voltage command value on the basis of an electric current difference between an electric current supplied to the electrically operated machine and an electric current command value.

11. The electric discharge controller according to claim 9, wherein the control element generates the d-axis voltage command value on the basis of a difference between a target direct current voltage that is the target value of the capacitor voltage and the direct current voltage detected by the direct current voltage detecting section detecting the capacitor voltage.

12. The electric discharge controller according to claim 9, wherein the control element sets the q-axis voltage command value to zero.

13. The electric discharge controller according to claim 9, wherein the control element generates the q-axis voltage command value on the basis of an angular velocity and a counter electromotive voltage constant.

14. The electric discharge controller according to claim 8, wherein the voltage command value for electric discharge is defined so that no q-axis electric current for torque generation is supplied.

* * * * *